United States Patent
Zwanger (10) Patent No.: US 7,760,939 B2
(45) Date of Patent: Jul. 20, 2010

(54) METHOD FOR AUTOMATICALLY GENERATING A BACKGROUND MASK FOR IMAGES WITH NOISY BACKGROUND AREAS, APPLICATIONS TO THAT END AND A NUCLEAR MAGNETIC RESONANCE TOMOGRAPHY APPARATUS FOR CARRYING OUT THE METHOD

(75) Inventor: Michael Zwanger, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 848 days.

(21) Appl. No.: 11/490,127

(22) Filed: Jul. 21, 2006

(65) Prior Publication Data
US 2007/0019861 A1 Jan. 25, 2007

(30) Foreign Application Priority Data
Jul. 22, 2005 (DE) .................. 10 2005 034 374

(51) Int. Cl.
*G06K 9/00* (2006.01)
(52) U.S. Cl. .................. 382/170; 382/128; 382/171; 382/172
(58) Field of Classification Search ................ 382/128, 382/170, 171, 172
See application file for complete search history.

(56) References Cited
U.S. PATENT DOCUMENTS

| 5,900,732 | A | 5/1999 | Felmlee et al. |
|---|---|---|---|
| 6,246,783 | B1 | 6/2001 | Avinash |
| 6,841,997 | B2 | 1/2005 | Feiweier |
| 7,343,193 | B2 * | 3/2008 | Block et al. ............ 600/410 |
| 2004/0254447 | A1 | 12/2004 | Block et al. |
| 2005/0001033 | A1 * | 1/2005 | Cheong et al. .......... 235/454 |
| 2005/0122256 | A1 * | 6/2005 | Szajnowski .......... 342/175 |
| 2005/0156593 | A1 | 7/2005 | Assmann et al. |
| 2005/0283070 | A1 * | 12/2005 | Imielinska et al. ....... 600/425 |
| 2009/0010517 | A1 * | 1/2009 | Basser et al. .......... 382/131 |

FOREIGN PATENT DOCUMENTS

| DE | 198 27 034 A1 | 3/1999 |
|---|---|---|
| DE | 101 22 874 A1 | 11/2002 |
| DE | 103 56 275 A1 | 6/2005 |

* cited by examiner

*Primary Examiner*—Vikkram Bali
*Assistant Examiner*—Eueng-Nan Yeh
(74) *Attorney, Agent, or Firm*—Harness, Dickey & Pierce, P.L.C.

(57) ABSTRACT

A method is disclosed for the generation of a background mask from an intensity-value-coded image with a noisy background area. The method includes generating an intensity value histogram of the image; fitting a model curve to a subarea of the intensity value histogram; calculating a threshold value in the intensity value histogram from the fit parameters of the model curve; and generating the background mask starting from at least one defined image area that belongs to the background noise by adding all the pixels whose intensities are below the threshold value to the background mask when connected to the image area via pixels whose intensities are also below the threshold value.

24 Claims, 3 Drawing Sheets

METHOD FOR AUTOMATICALLY GENERATING A BACKGROUND MASK FOR IMAGES WITH NOISY BACKGROUND AREAS, APPLICATIONS TO THAT END AND A NUCLEAR MAGNETIC RESONANCE TOMOGRAPHY APPARATUS FOR CARRYING OUT THE METHOD

PRIORITY STATEMENT

The present application hereby claims priority under 35 U.S.C. §119 on German patent application number DE 10 2005 034 374.0 filed Jul. 22, 2005, the entire contents of which is hereby incorporated herein by reference.

FIELD

The present invention generally relates to a method for automatically generating a background mask for images with noisy background areas, in particular for magnetic resonance tomography images (MRT images). Furthermore, the present invention also generally relates to a method for automatically masking noisy background areas for images, and/or to a method for determining a quality measure for images having noisy background areas. Furthermore, the present invention generally relates to a nuclear magnetic resonance tomography apparatus such as one that is set up in order to carry out the method, for example; and it generally relates to a computer software product that implements the method when it runs on a computer unit connected to the nuclear magnetic resonance tomography apparatus.

BACKGROUND

Background noise expressed at different levels occurs for MRT images as a function of the recording sequence. For example, for diffusion-weighted MRT images that have been recorded with the aid of an EPI (Echo Planar Imaging) sequence the background tends to be very noisy. Such images are often used for further calculations in order to display clinically relevant information more effectively. Thus, a number of diffusion-weighted images of the same slice plane are used with a different level of diffusion weighting to calculate an ADC (Apparent Diffusion Coefficient) image by using a nonlinear fit to match the image data of at least two images having a different diffusion weighting.

In this method, the background noise of the diffusion-weighted images is intensified and generates an interfering noise in the ADC image. So far, the problem has been solved by generating a background mask that masks the noisy background areas. In this case, all the pixels whose intensity in the image with the diffusion weighting of level zero is below a specific threshold value form the background mask. This background mask sets the intensity of the corresponding pixels to zero in ADC images of the same slice plane. The threshold value is set manually as a rule.

In the case of the SIEMENS MAGNETOM Harmony MRT apparatus, for example, the threshold value to be used is set manually before beginning a measurement. The success of the method depends in this case on the experience of the user who carries out the measurement and determines the threshold value. A wrongly set threshold value can lead to a loss of medically important information. The measurement must be repeated, if appropriate, and this entails higher costs and a relatively larger outlay on time.

DE 103 56 275 A1 describes a method for automatically segmenting phase-coded flow images in MRT. Here, at least one phase image of an area flowed through by blood is measured with the aid of the MRT and areas flowed through are thereupon automatically segmented in the phase image. On the basis of a histogram that is calculated from the phase image, inter alia, the segmenting can be performed by stipulating a threshold value in the histogram. It is likewise possible to segment areas flowed through by using a seed growth algorithm that scans the existing flow regions from inside out starting from a nucleus in the interior of the area flowed through.

US 2004/0254447 A1 discloses a method of background suppression for time-resolved magnetic resonance angiographies. In this method, an orthogonality image that is masked in a further method step is calculated from a series of temporally resolved MRT images. To this end, a histogram of the orthogonality image is processed and, inter alia, fitted with the aid of a Gaussian curve, and a threshold value is calculated on the basis thereof.

DE 101 22 874 A1 discloses a method for extracting spin collectives with different chemical shift from phase-coded individual images by taking account of field inhomogeneities. In this method, a threshold value is stipulated on the basis of an automatic noise level estimate.

SUMMARY

A method is specified, in at least one embodiment of the present invention, that automatically generates a background mask for an image having noisy background areas. A method is further specified, in at least one embodiment of the present invention, in which noisy background areas are masked or identified with the aid of the generated background mask, or in which the background mask generated is used to generate a quality measure for an image having noisy background areas. A nuclear magnetic resonance tomography apparatus and a computer software product are further specified, in embodiments of the present invention, with the aid of which a background mask can be generated automatically for an image having noisy background areas.

The method for the automated generation of a background mask, in accordance with at least one embodiment of the present invention, for an intensity-value-coded image having a noisy background area has at least the following steps:
generating an intensity value histogram of the image,
fitting a model curve to a subarea of the intensity value histogram,
calculating a threshold value in the intensity value histogram from the fit parameters of the model curve, and
generating the background mask in a fashion starting from at least one defined image area that belongs to the background noise by adding all the pixels whose intensities are below the threshold value to the background mask when they are connected to the image area via pixels whose intensities are likewise below the threshold value.

With the aid of at least one embodiment of the invention, a background mask is generated automatically for an image having noisy background areas without the need for interaction with the user. A step in the processing that is affected by error and is susceptible to delay is thereby automated. At least one embodiment of the invention is suitable, in particular, for diffusion-weighted MRT images for which background masks are generated in order during further processing of these images to identify background areas that have a particularly disturbing effect there.

The subarea of the intensity value histogram that is fitted with the aid of the model curve is advantageously the subarea about a local maximum in the intensity value histogram that belongs to the background noise, since this subarea is clearly displayed in the intensity value histogram even for noisier images.

This area is preferably matched with the aid of a Gaussian curve, since the intensity distribution of the noise can be effectively approximated with the aid of this form of curve, and since the fit of the Gaussian curve is a numerically stable method. However, it is also possible for other model curves, for example a Rice distribution or polynomial functions, to be fitted to the area when use is made of suitable fit algorithms that match the model curve in a numerically stable way to the intensity distribution in the subarea.

Fit parameters of the model curve are used to calculate a threshold value which is characterized in that the function value of the model curve has always clearly decayed at the threshold value. When the model curve to be fitted is a Gaussian curve, the standard deviation σ and the mean μ are expediently those fit parameters from which the threshold value is calculated. In one possible refinement, the threshold value S is calculated with the aid of the formula S=μ+ 2√2ln2σ, since the function value of the Gaussian curve has decayed sharply at the threshold value.

After the calculation of the threshold value, starting from at least one defined image area that belongs to the background noise, all the pixels whose intensities are below the threshold value are combined to form a background mask when they cohere with the image area via pixels whose intensity is likewise below the threshold value. It is advantageous in this case to proceed from parts of the image edge, since this image area usually belongs to the background for the images to be processed.

By way of this method, pixels that have an intensity below the threshold value and which, however, are located in the interior of an anatomical structure are not added to the background mask, since they are located in the interior of structures having a high signal intensity and are not connected to an image corner via pixels whose intensity is below the threshold value. In addition to the image corners, it is also possible to take other image areas as starting points when it is known from the special three-dimensional shape of the recorded anatomical structure that the image area belongs to the background. For example, the center belongs to the background in the case of a frontal section of both legs, and so the background mask can be generated starting from this area.

In a further refinement, the user can identify before or after measuring the images an area that belongs to the background noise, such that it is then possible to generate the background mask starting from this area. The method can thereby be adapted in a simple way to particular circumstances of the recorded anatomical structure.

In an example embodiment or refinement, a modified background mask is generated from the background mask by combining topographically coherent pixels that are not covered by the background mask to form at least one cluster, and by virtue of the fact that a cluster produced in such a way is added to the modified background mask as a function of its size and/or its mean intensity value. As a result of this refinement, individual pixels which certainly belong to the background noise but whose intensity is above the threshold value so that they are not covered in the background mask are now added to the modified background mask. As a rule, these pixels form clusters whose size is small by comparison with the clusters that are formed by anatomical structures, and have as a rule a mean intensity that is only just above the threshold value, while the clusters of anatomical structures are clearly above the threshold value. The quality of the background mask is improved by this method.

In an advantageous embodiment or refinement, the decision as to whether a cluster is or is not added to the modified background mask is reached by virtue of the fact that the size and the mean intensity of the cluster are weighted independently of one another with the aid of one numerical value each, $P_S$ and $P_I$, respectively. When the product $P_S \cdot P_I$ is above a specific limiting value, the cluster is added to the modified background mask.

In one possible refinement or embodiment, the size of the cluster $S_C$ is weighted with the aid of the numerical value $P_S$ that is calculated using the formula $P_S = (S_C+1)^{-3/2}$. The mean intensity $I_{Mitt\_C}$ is weighted with the aid of the numerical value $P_I$ that is calculated using the formula, $$P_I = \frac{I_{max}}{I_{Mitt\_C} - S + 0.00001},$$

$I_{max}$ being the maximum intensity value of the image and S being the threshold value. The cluster is now added to the modified background mask when the product of the two numerical values $P_S \cdot P_I$ is above the value 10. This advantageous refinement may be adapted here to the special requirements of diffusion-weighted MRT images. In the case of other types of images, other weightings of the size and/or the mean intensity value of the cluster are required and should be matched to the special properties of the pictures.

The method can encounter its limits in the case of particularly noisy images having a very weak signal from anatomical structures, since the area assigned to the background noise in the intensity value histogram can no longer be clearly separated from the area that includes the actual image information. By applying the method in the case of such images, it is possible to calculate image areas for the background mask that include clinically relevant information. Such an image is identified by a high quotient $S/I_{max}$, S being the threshold value, and $I_{max}$ being the maximum intensity value of the image. In an advantageous refinement of the invention, this quotient is calculated as a measure of the quality of the background mask. With the aid of this measure, it is possible to decide whether the background mask is to be used in the case of further processing steps. If, for example, the background mask is used for the purpose of masking a noisy background area for images, the masking can be rejected when the quotient overshoots a specific value—for example 0.3—, that is to say when the quality of the mask is excessively poor. This prevents the background mask from masking areas that bear clinically relevant image information.

MRT images are particularly suitable for this method, in particular those for which a masking of the background is required such as, for example, diffusion-weighted images, perfusion-weighted images or MR temperature mapping images. However, since the method is based only on the image data, it can also be applied to images that have been obtained with the aid of other apparatuses such as, for example, CT images or ultrasound images.

The method is expediently applied in the case of an image composed of a series of diffusion-weighted MRT images having different levels of diffusion weighting. It is possible thereby to generate the background mask from the image having the best signal-to-noise ratio. This is usually the image having the lowest level of diffusion weighting. The series of diffusion-weighted MRT images advantageously also includes an image having the diffusion weighting of level zero, since here the signal-to-noise ratio is best.

The method for the automated masking and/or identification of a noisy background area in accordance with an embodiment for an intensity-value-coded image, has at least the following steps:

generating a background mask for the image, and masking the image with the aid of the background mask or identifying the noisy background area with the aid of the background mask.

In this context, masking signifies that the intensity value of all the pixels that belong to the background mask is set to zero. An identification of the background areas signifies that the image information of the background area is to be treated in another way than the remaining image data during further processing of the image; for example, a different filter can be applied to background areas than to the remaining image data.

Furthermore, a method for the automated masking and/or identification of a noisy background area in accordance with an embodiment for a further image, has at least the following steps:

generating a background mask for an intensity-value-coded image, the intensity-value-coded image and the further image imaging the same structures in the same slice plane, and masking the further image with the aid of the background mask or identifying the noisy background area with the aid of the background mask.

In this method, the background mask that has been generated for one image is applied to another image. The advantage resides in that for specific images to be masked the background is excessively noisy such that the quality of the background mask is excessively poor and therefore is not generated directly for this image. However, there are often images that display the same structure in the same slice plane and for which the background is less noisy, and so these images can be used to generate the background mask. This is the case, in particular, for a series of diffusion-weighted MRT images for which the background mask is usually generated at the image with the least diffusion weighting. This background mask can then be applied to all the images of the series. This background mask can also mask the background for an ADC image that has been calculated from the series of diffusion-weighted MRT images.

In at least one embodiment, a method is for automatically determining a quality measure of an image, comprising at least the following steps:

generating a background mask for the image, and determining the quality measure by relating the intensity values of all the pixels to the intensity values of those pixels that belong to the background mask.

This quality measure identifies a signal-to-noise ratio for an image. For a very noisy image, the intensity values of the background area differ, for example, less strongly from the intensity values of all the pixels than for a weakly noisy image. In a particularly simple refinement, the quotient $$\frac{I_{Mitt\_Ges}}{I_{Mitt\_Mask}}$$

is calculated as a quantitative value for the quality measure, $I_{Mitt\_Ges}$ being the mean intensity value of all the image pixels, and $I_{Mitt\_Mask}$ being the mean intensity value of the image pixels that belong to the background mask. This value can be output together with the image such that the user can immediately detect the quality of a picture.

Furthermore, in accordance with an example embodiment of the present invention, a nuclear magnetic resonance tomography apparatus is disclosed that is, for example, suitable for carrying out a method in accordance with at least one embodiment of the invention.

Likewise, a computer software-product is disclosed that, for example, implements a method of at least one embodiment when it runs on a computing device, incorporated within or connected to a nuclear magnetic resonance tomography apparatus. Further, a computer readable medium is disclosed, for causing a computer unit to implement the method of at least one embodiment when run on the computer unit, the computer unit being at least one of connected to and incorporated within a nuclear magnetic resonance tomography apparatus.

BRIEF DESCRIPTION OF THE DRAWINGS

Further advantages, features and properties of the present invention are now explained in more detail with the aid of example embodiments and with reference to the accompanying drawings, in which.

DETAILED DESCRIPTION OF THE EXAMPLE EMBODIMENTS

Figure 1:
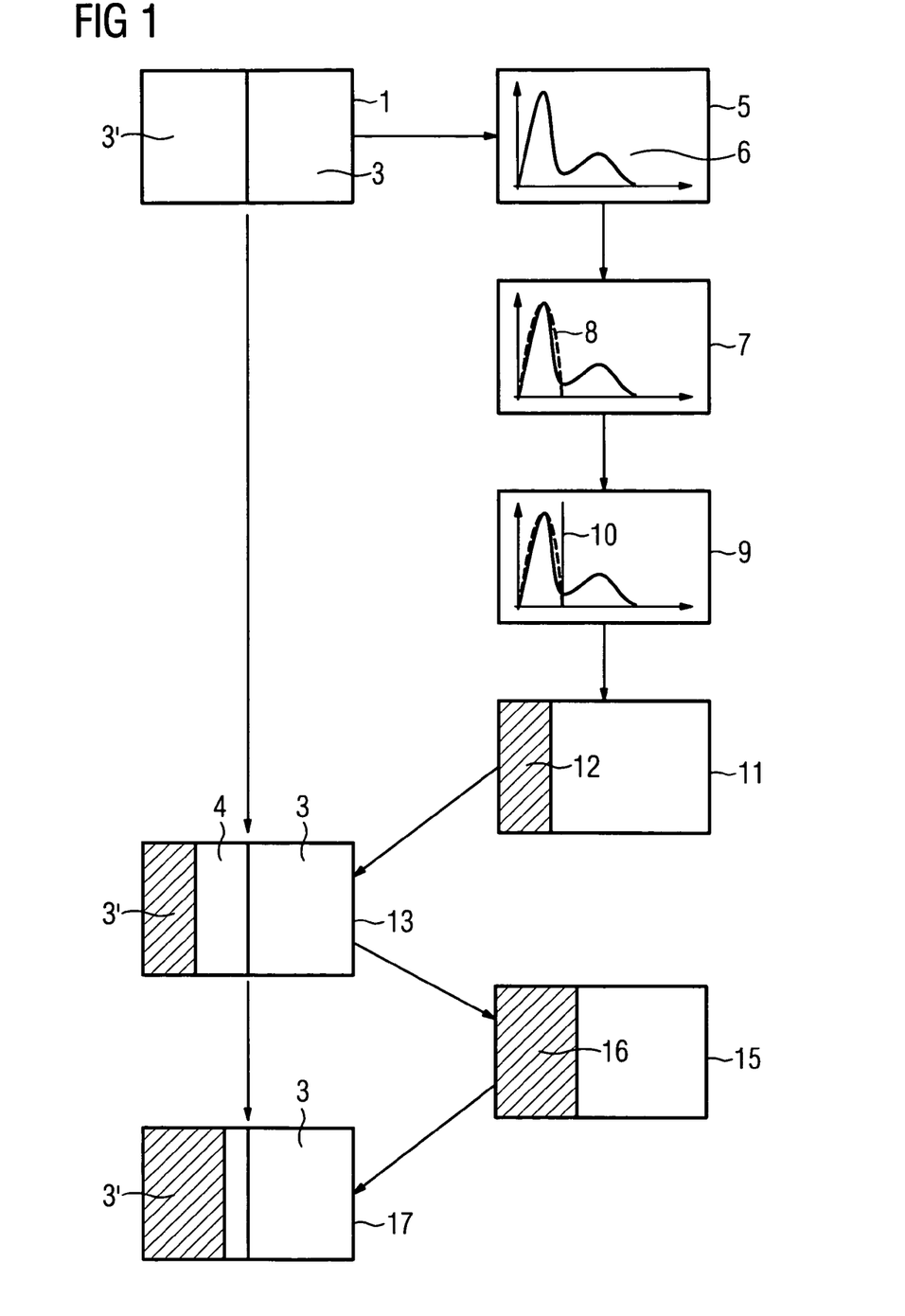
FIG. 1 shows a schematic of the method sequence as it occurs during the masking of a noisy background area for the image.

FIG. 1 shows a schematic of the method sequence of an embodiment, as it is applied in the masking of a noisy background area 3' for an intensity-value-coded image 1. The starting point is an intensity-value-coded image 1 as it is used, for example, in medical imaging when displaying anatomical structures. The image 1 includes image areas 3 having relevant image information relating to the anatomical structures, and noisy background areas 3'.

In a first method step 5, an intensity value histogram 6 is generated from the image data. A subarea of the intensity value histogram 6 is fitted with the aid of a model curve 8 in a second method step 7. In a third method step 9, the fit parameters of the model curve 8 are used to calculate an intensity value as threshold value 10 that separates the subarea in the intensity value histogram 6 that is predominantly correlated with the background noise from the subarea that is predominantly correlated with the anatomical structures.

In the fourth method step 11, there are added to the background mask 12 those image areas whose pixels have an intensity value below the threshold value 10 and that are not located in the interior of anatomical structures. The background mask 12 is applied to the image 1 and generates a masked image 13 in which the background region 3' is covered to a substantial extent by the background mask 12.

After the background mask 12 has been applied to the image 1, it is still possible for specific areas 4 to occur that, while certainly belonging to the background noise, are not covered by the background mask 12. These are chiefly those image areas of the background noise 3' whose intensity value is above the threshold value 10.

Consequently, in a fifth method step 15 there is generated from the background mask 12 a modified background mask 16 that is at least just as large as the background mask 12 and that covers the background area 3' more effectively than the original background mask 12. In this method step 15, all the pixels that are not masked by the background mask 12 and that are topographically coherent are combined to form a cluster in each case. Such a cluster is added to the background mask 12 as a function of its size and/or its mean intensity value. A modified background mask 16 is thereby generated. In the sixth method step 17, the modified background mask 16 is applied to the image 1.

The background mask or the modified background mask 12, 16 need not, however, absolutely be applied to the original image 1. The background mask or the modified background mask 12, 16 can likewise mark the noisy background area 3' for a different image that displays the same structure in the same slice plane as occurs, for example, with images of a series of diffusion-weighted MRT images having different levels of diffusion weighting. Again, the background mask or the modified background mask 12, 16 can only be used for the purpose of describing the quality of an image in a quantitative value, for example by dividing the mean intensity of the pixels that belongs to the background mask 12, 16 by the mean intensity of all the pixels.

Figure 2:
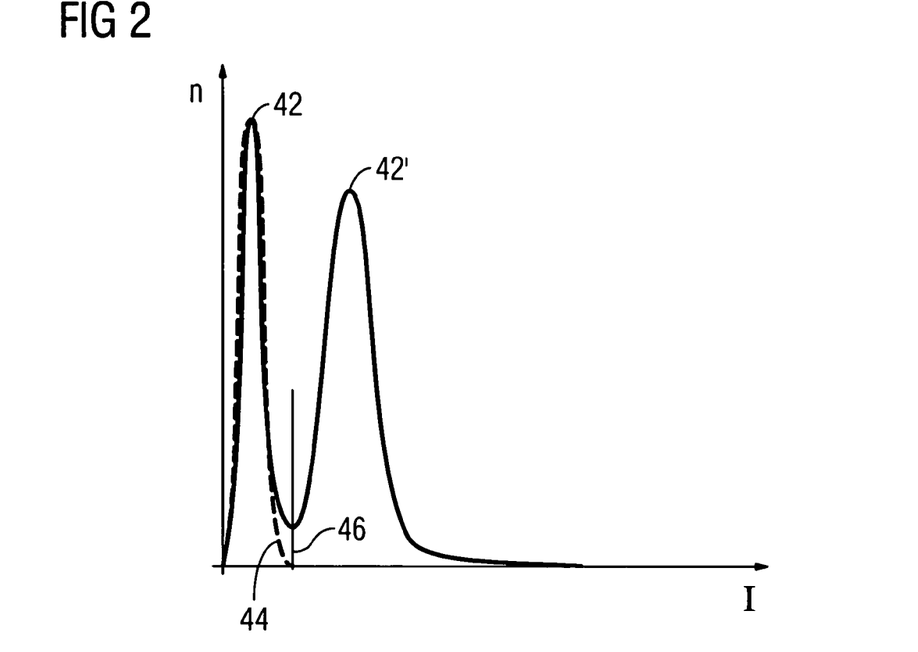
FIG. 2 shows a schematic of the curve profile of an intensity value histogram with the fit of a Gaussian curve to a subarea.

FIG. 2 shows an example of an intensity value histogram of an MRT image with the fit of a Gaussian curve 44 to a subarea. The frequency n with which a specific intensity occurs in the image is plotted here as a function of the intensity I. In this example, which is rather of a textbook nature, two local maxima 42 and 42' are clearly to be seen in the intensity value histogram, the subarea about the left-hand maximum 42 identifying the intensity distribution of the background noise, while the subarea about the right-hand maximum 42' identifies the intensity distribution of the actual image information.

The area about the left-hand maximum 42 is fitted with the aid of a Gaussian curve 44 that is a suitable model curve for this subarea. A threshold value S 46 that separates the background noise from the actual image information is calculated using the relationship $S=\mu+2\sqrt{2\ln2}\sigma$ from the parameters $\mu$ and $\sigma$ (mean and standard deviation, respectively) of the Gaussian curve. The threshold value 10, 46 is characterized in that the function value of the model curve 8—in this case the Gaussian curve 44—has clearly decayed at the threshold value 10, 46.

Figure 3:
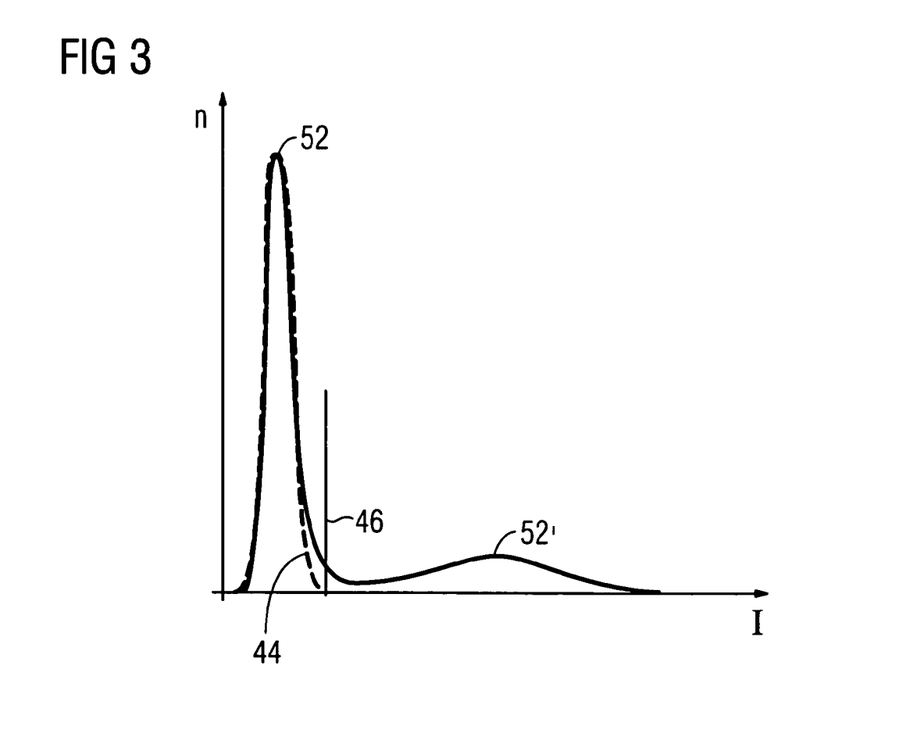
FIG. 3 shows a schematic of the curve profile of another intensity value histogram with the fit of a Gaussian curve to a subarea.

In practice, intensity value histograms do not always have this clear distinction between background noise and image information. FIG. 3 illustrates the intensity value histogram of an MRT image that originates from a series of diffusion-weighted images with a diffusion weighting of different level, the level of the diffusion weighting in the image shown here being zero. The areas about the left-hand and right-hand maximum 52 and 52', respectively, here identify the intensity distributions of the background noise or the actual image information. The right-hand subarea is, however, clearly flatter and wider than the left-hand one. The fit of the Gaussian curve 44 to the left-hand subarea is also possible without any problem; the threshold value 46 can be calculated using the same formula.

Whereas it is possible in FIG. 2 also to fit the right-hand subarea or even the transitional area with the minimum by means of suitable model curves 8, this can be done in FIG. 3 only in a more restricted way since then the stability of the method is no longer ensured.

In the case of particularly noisy images having a very weak signal from anatomical structures, the intensity distributions of the background noise and the actual image information are strongly overlaid. In the intensity value histogram, the area assigned to the background noise can no longer be clearly separated from the area that contains the actual image information. Applying the method to such an image would assign to the background noise areas that include clinically relevant image information. Such an image is identified by a high quotient $S/I_{Max}$, S being the threshold value and $I_{Max}$ being the maximum intensity value of the image.

This quotient simultaneously constitutes a measure of the quality of the background mask 12, 16. Separately identifying the image when the quotient exceeds a specific value—for example 0.3—alerts the user clearly to the fact that the method has encountered its limits. In one possible refinement, the user can thereupon decide for himself whether he wishes to retain the (modified) background mask 12, 16, or not. In another possible refinement, the (modified) background mask 12, 16 can again be removed automatically when the quotient is above the-specific value.

Figure 4:
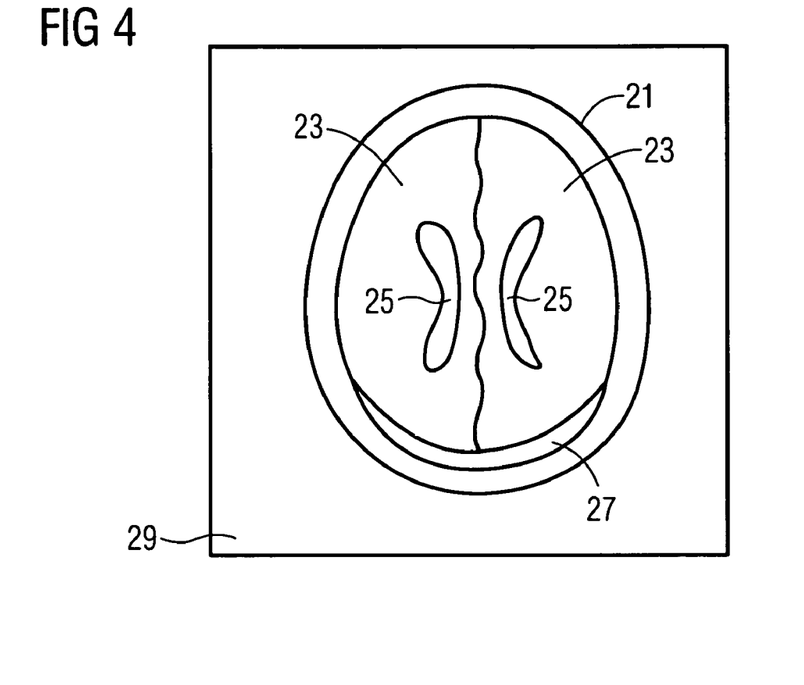
FIG. 4 shows the anatomical structure of the skull in the case of a transverse slice.

FIG. 4 shows a schematic of an anatomical structure 21 of the skull as it occurs in a transverse slice through the skull for diffusion-weighted MRT images. The two brain halves 23 and the ventricular system 25 are usually displayed with strong signals. However, structures 27 with weak signals also exist in the interior of the skull such as, for example, a sinus through which blood is flowing. Their intensity values can be below the threshold value 10, 46. In this image, an image corner 29 always constitutes an image area that includes only background noise.

Starting from this area, there are added to the background mask 12 all the pixels whose intensity is below the threshold value 10, 46 and that cohere with the image area via pixels whose intensity is likewise below the threshold value 10, 46. As a result of this approach, areas 27 with weak signals in the interior of the anatomical structure 21 are not added to the background mask 12.

Figure 5:
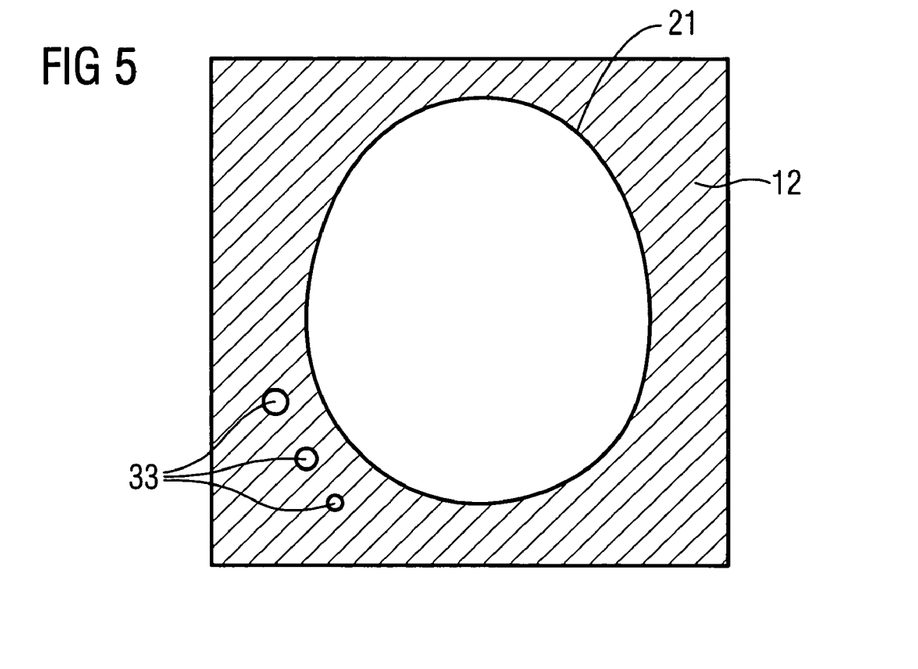
FIG. 5 shows the background mask that has been generated from the anatomical structure of the skull in FIG. 4 for a transverse slice.

Sketched in FIG. 5 is a background mask that belongs to the anatomical structure 21 illustrated in FIG. 4. The background mask leaves out the entire anatomical structure 21 of the skull. In this present case, relatively small areas 33 are also additionally left out in addition to the anatomical structure 21, since in these regions 33 the intensity of the background noise was above the threshold value 10, 46. By modifying the background mask 12, these areas, which actually belong to the background noise, are added to a modified background mask 16, as was described in method step 15. To this end, topographically coherent pixels that are not covered by the background mask 12 are used to form a cluster in each case.

In FIG. 5, a cluster results in each case from the anatomical structure of the skull 21 and the relatively small areas 33. Each cluster is weighted in accordance with its size and/or its mean intensity. Anatomical structures 21 such as that of the skull in FIG. 4 form comparatively large clusters and have a comparatively high mean intensity value. Clusters that are formed from pixels that belong to the background noise 3' form comparatively small clusters and have a comparatively low mean intensity value.

In order to decide whether a cluster is added to the background mask 12 or not, the size of a cluster and/or the mean intensity value can be weighted with the aid of a numerical value. If the numerical value is above or below a stipulated limiting value, the cluster is or is not added to the background mask 12.

In the special case of diffusion-weighted MRT images, the following formulae are suitable for weighting the size and the intensity of a cluster: the size of the cluster $S_C$ is weighted using the relationship $PS=(S_{C+}1)^{-3/2}$ with the aid of the numerical value $P_S$. The mean intensity value $I_{Mitt\_C}$ is weighted in accordance with the relationship $$P_I = \frac{I_{max}}{I_{Mitt\_C} - S + 0.00001}$$

with the aid of the numerical value $P_I$, $I_{Max}$ being the maximum intensity value of the image and S being the threshold value. The cluster is now added to the background mask 12 when the product of the two numerical values $P_S \cdot P_I$ is above the value 10.

Further, elements and/or features of different example embodiments may be combined with each other and/or substituted for each other within the scope of the disclosure and claims.

Still further, any one of the above-described and other example features of the present invention may be embodied in the form of an apparatus, method, system, computer program and computer program product. For example, of the aforementioned methods may be embodied in the form of a system or device, including, but not limited to, any of the structure for performing the methodology illustrated in the drawings.

Even further, any of the aforementioned methods may be embodied in the form of a program. The program may be stored on a computer readable media and is adapted to perform any one of the aforementioned methods when run on a computer device (a device including a processor). Thus, the storage medium or computer readable medium, is adapted to store information and is adapted to interact with a data processing facility or computer device to perform the method of any of the above mentioned embodiments.

The storage medium may be a built-in medium installed inside a computer device main body or a removable medium arranged so that it can be separated from the computer device main body. Examples of the built-in medium include, but are not limited to, rewriteable non-volatile memories, such as ROMs and flash memories, and hard disks. Examples of the removable medium include, but are not limited to, optical storage media such as CD-ROMs and DVDs; magneto-optical storage media, such as MOs; magnetism storage media, including but not limited to floppy disks (trademark), cassette tapes, and removable hard disks; media with a built-in rewriteable non-volatile memory, including but not limited to memory cards; and media with a built-in ROM, including but not limited to ROM cassettes; etc. Furthermore, various information regarding stored images, for example, property information, may be stored in any other form, or it may be provided in other ways.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method for at least one of masking and identifying a noisy background area an intensity-value-coded image, the method comprising:
    generating a background mask for the intensity-value-coded image by generating an intensity value histogram of the image;
        fitting a model curve to a subarea of the intensity value histogram related to background noise;
        calculating a threshold value in the intensity value histogram from fit parameters of the model curve, the threshold value separating the subarea of the intensity value histogram related to the background noise from a subarea of the intensity value histogram related to an anatomical structure; and
        generating the background mask, starting from at least one defined image area belonging to the background noise, by adding all pixels having intensities below the threshold value to the background mask and all pixels connected to the at least one defined image area via pixels also having intensities below the threshold value;
    at least one of masking the intensity-value-coded image using the generated background mask and identifying the noisy background area in the intensity-value-coded image using the background mask,
    generating a modified background mask for the intensity-value-coded image from the generated background mask by combining topographically coherent pixels that are not covered by the generated background mask to form at least one cluster, and
    adding at least one cluster to the modified background mask as a function of a mean intensity value of the at least one cluster.

2. The method as claimed in claim 1, wherein the subarea of the intensity value histogram related to the background noise being fitted with the model curve is the area about a local maximum in the intensity value histogram that belongs to the background noise.

3. The method as claimed in claim 2, wherein the model curve to be fitted is a Gaussian curve.

4. The method as claimed in claim 1, wherein the model curve to be fitted is a Gaussian curve.

5. The method as claimed in claim 4, wherein the fit parameters from which the threshold value is calculated are the standard deviation $\sigma$ and the mean $\mu$ of the Gaussian curve.

6. The method as claimed in claim 5, wherein the threshold value S is calculated using the formula $S=\mu+2\sqrt{2\ln 2}\sigma$.

7. The method as claimed in claim 1, wherein the at least one defined image area belonging to the background noise is a part of an image edge.

8. The method as claimed in claim 1, wherein the at least one defined image area belonging to the background noise is an area with background noise stipulated by an user.

9. The method as claimed in claim 1, wherein the at least one cluster is added to the modified background mask when a product of $P_I \cdot P_S$ is above a limiting value, $P_S$ being a numerical value that weighs a size of the cluster, and $P_I$ being a numerical value that weighs the mean intensity of the at least one cluster.

10. The method as claimed in claim 9, wherein the numerical value $P_S$ is calculated from the size of the at least one cluster $S_C$ using the formula $P_S=(S_C+1)^{-3/2}$.

11. The method as claimed in claim 9, wherein the numerical value $P_I$ is calculated from the mean intensity of the at least one cluster $I_{Mitt\_C}$ using the formula $$P_I = \frac{I_{max}}{I_{Mitt\_C} - S + 0.00001},$$

$I_{max}$ being the maximum intensity value of the image and S being the threshold value.

12. The method as claimed in claim 1, wherein a measure of the quality of the generated background mask is calculated by calculating a quotient of the threshold value and a maximum intensity value of the image.

13. The method as claimed in claim 1, wherein the intensity-value-coded image is an MRT image.

14. The method as claimed in claim 1, wherein the intensity-value-coded image is an image from a series of diffusion-weighted MRT images having different levels of diffusion weighting.

15. The method as claimed in claim 14, wherein the series of diffusion-weighted MRT images also includes an image having a diffusion weighting of level zero.

16. A method for at least one of masking and identifying a noisy background area for a further image, the method comprising:
    generating a background mask for an intensity-value-coded image by generating an intensity value histogram of the image;
        fitting a model curve to a subarea of the intensity value histogram, related to background noise;
        calculating a threshold value in the intensity value histogram from fit parameters of the model curve, the threshold value separating the subarea of the intensity value histogram related to the background noise from a subarea of the intensity value histogram related to an anatomical structure; and
        generating the background mask, starting from at least one defined image area belonging to the background noise, by adding all pixels having intensities below the threshold value to the background mask and all pixels connected to the at least one defined image area via pixels also having intensities below the threshold value, the intensity-value-coded image and the further image displaying same anatomical structures in a same slice plane;
    at least one of masking the further image using the generated background mask and identifying the noisy background area using the generated background mask,
    generating a modified background mask for the intensity-value-coded image from the generated background mask by combining topographically coherent pixels that are not covered by the generated background mask to form at least one cluster, and
    adding at least one cluster to the modified background mask as a function of a mean intensity value of the at least one cluster.

17. The method for at least one of masking and identifying a noisy background area as claimed in claim 16, wherein the further image and the intensity-value-coded image are two images of an image series that displays the same anatomical structure in the same slice plane.

18. The method for at least one of masking and identifying a noisy background area as claimed in claim 17, wherein the further image is an image that has been generated by further processing of the image series.

19. A method for determining a quality measure of an image, comprising:
    generating a background mask for the image by generating an intensity value histogram of the image;
        fitting a model curve to a subarea of the intensity value histogram related to background noise;
        calculating a threshold value in the intensity value histogram from fit parameters of the model curve, the threshold value separating the subarea of the intensity value histogram related to the background noise from a subarea of the intensity value histogram related to an anatomical structure; and
        generating the background mask, starting from at least one defined image area belonging to the background noise, by adding all pixels having intensities below the threshold value to the background mask and all pixels connected to the at least one defined image area via pixels also having intensities below the threshold value;
    determining the quality measure by relating intensity values of all image pixels to intensity values of pixels belonging to the background mask,
    generating a modified background mask for the intensity-value-coded image from the generated background mask by combining topographically coherent pixels that are not covered by the generated background mask to form at least one cluster, and
    adding at least one cluster to the modified background mask as a function of a mean intensity value of the at least one cluster.

20. The method for determining a quality measure of an image as claimed in claim 19, wherein the quality measure is a quotient $$\frac{I_{Mitt\_Ges}}{I_{Mitt\_Mask}},$$

$I_{Mitt\_Ges}$ being the mean intensity value of all the image pixels, and $I_{Mitt\_Mask}$ being the mean intensity value of the image pixels of the background mask.

21. A nuclear magnetic resonance tomography apparatus for carrying out the method in accordance with claim 1.

22. A non-transitory computer readable medium, for causing a computer unit to implement the method in accordance with claim 1 when run on the computer unit, the computer unit being at least one of connected to and incorporated within a nuclear magnetic resonance tomography apparatus.

23. A nuclear magnetic resonance tomography apparatus for generation of a background mask from an intensity-value-coded image having a noisy background area, the apparatus comprising:
    means for generating an intensity value histogram of the image;
    means for fitting a model curve to a subarea of the intensity value histogram, related to background noise;
    means for calculating a threshold value in the intensity value histogram from fit parameters of the model curve, the threshold value separating the subarea of the intensity value histogram related to the background noise from a subarea of the intensity value histogram related to an anatomical structure;
    means for generating the background mask, starting from at least one defined image area belonging to the background noise, by adding all pixels having intensities below the threshold value to the background mask and all pixels connected to the at least one defined image area via pixels also having intensities below the threshold value
    means for generating a modified background mask for the intensity-value-coded image from the generated background mask by combining topographically coherent pixels that are not covered by the generated background mask to form at least one cluster, and
    means for adding at least one cluster to the modified background mask as a function of a mean intensity value of the at least one cluster.

24. A computer software product stored on a non-transitory computer readable medium for, where run on a computer unit, implementing the method in accordance with claim 1, the computer unit being at least one of connected to and incorporated within a nuclear magnetic resonance tomography apparatus.

* * * * *